United States Patent
Jäderberg (10) Patent No.: US 9,962,861 B2
(45) Date of Patent: May 8, 2018

(54) DEVICE AND METHOD FOR HEATING A MOULD OR TOOL

(75) Inventor: Jan Jäderberg, Karlshamn (SE)

(73) Assignee: TCTech Sweden AB (SE)

( * ) Notice: Subject to any disclaimer, the term of this patent is extended or adjusted under 35 U.S.C. 154(b) by 989 days.

(21) Appl. No.: 14/129,954

(22) PCT Filed: Jun. 8, 2012

(86) PCT No.: PCT/SE2012/050617
§ 371 (c)(1),
(2), (4) Date: Aug. 29, 2014

(87) PCT Pub. No.: WO2013/002703
PCT Pub. Date: Jan. 3, 2013

(65) Prior Publication Data
US 2014/0367886 A1    Dec. 18, 2014

Related U.S. Application Data

(60) Provisional application No. 61/501,976, filed on Jun. 28, 2011.

(51) Int. Cl.
*H05B 6/10* (2006.01)
*B29C 33/06* (2006.01)
(Continued)

(52) U.S. Cl.
CPC ............ *B29C 33/06* (2013.01); *B29C 45/73* (2013.01); *B29C 59/002* (2013.01); *B29K 2905/02* (2013.01); *B29K 2905/10* (2013.01); *B29K 2905/12* (2013.01); *B29K 2909/08* (2013.01); *B29K 2995/0005* (2013.01); *B29K 2995/0007* (2013.01); *B29K 2995/0008* (2013.01)

(58) Field of Classification Search
USPC ......................................... 219/632–635, 659
See application file for complete search history.

(56) References Cited

U.S. PATENT DOCUMENTS

| 4,563,145 A | 1/1986 | De |
| 5,176,839 A | 1/1993 | Kim |

(Continued)

FOREIGN PATENT DOCUMENTS

| CN | 1478642 A | 3/2004 |
| CN | 1767938 A | 5/2006 |

(Continued)

*Primary Examiner* — Austin Murata
(74) *Attorney, Agent, or Firm* — Condo Roccia Koptiw LLP (57) ABSTRACT

The present disclosure relates to a tool such as an injection moulding tool or an embossing tool. A heating device including a stack of layers is provided for heating a tool surface. The stack may include a coil carrier layer with a number of wound coils for generating a magnetic field, and a conductive top layer, being adjacent to the tool surface currents are induced in the top layer to heat the surface. Efficient heating may be provided by solutions involving low resistivity layers that lead currents to the top layer without themselves developing heat to any greater extent. A conduction frame device can be provided beneath the top layer and around the perimeter thereof to provide reliable contact with a backing layer.

14 Claims, 7 Drawing Sheets

(51) Int. Cl.
  *B29C 45/73* (2006.01)
  *B29C 59/00* (2006.01)

(56) References Cited

U.S. PATENT DOCUMENTS

| | | | |
|---|---|---|---|
| 5,762,972 A | 6/1998 | Byon | |
| 5,808,281 A | 9/1998 | Matsen et al. | |
| 5,837,183 A | 11/1998 | Inoue et al. | |
| 5,955,120 A | 9/1999 | Deissler | |
| 6,599,376 B2 | 7/2003 | Morikawa et al. | |
| 7,132,632 B2 | 11/2006 | Huang | |
| 7,462,029 B1 | 12/2008 | Hung et al. | |
| 7,981,350 B2 | 7/2011 | Jäderberg et al. | |
| 8,235,697 B2 | 8/2012 | Olin et al. | |
| 8,794,950 B2 | 8/2014 | Feigenblum et al. | |
| 2003/0215540 A1 | 11/2003 | Asai | |
| 2003/0234470 A1 | 12/2003 | Haan et al. | |
| 2004/0009260 A1 | 1/2004 | Gabriel | |
| 2004/0041303 A1 | 3/2004 | Kim et al. | |
| 2004/0188427 A1 | 9/2004 | Huang | |
| 2005/0035115 A1* | 2/2005 | Anderson | B29C 33/04 219/759 |
| 2005/0053691 A1 | 3/2005 | Gabriel | |
| 2005/0156342 A1 | 7/2005 | Harper et al. | |
| 2006/0081615 A1 | 4/2006 | Kataoka et al. | |
| 2006/0113030 A1 | 6/2006 | Houzego et al. | |
| 2008/0203088 A1 | 8/2008 | Kinouchi et al. | |
| 2009/0068306 A1 | 3/2009 | Jaderberg et al. | |
| 2009/0074905 A1* | 3/2009 | Matsen | B29C 33/06 425/547 |
| 2009/0220723 A1 | 9/2009 | Jaderberg et al. | |
| 2009/0239023 A1 | 9/2009 | Olin et al. | |
| 2010/0000980 A1 | 1/2010 | Popescu | |
| 2010/0052667 A1 | 3/2010 | Kohama et al. | |
| 2011/0233826 A1* | 9/2011 | Guichard | B29C 33/06 264/486 |

FOREIGN PATENT DOCUMENTS

| | | |
|---|---|---|
| CN | 201287451 Y | 8/2009 |
| CN | 102017790 A | 4/2011 |
| EP | 146191 A1 | 6/1985 |
| EP | 0505738 A1 | 9/1992 |
| EP | 1800829 A1 | 6/2007 |
| EP | 1925421 A1 | 5/2008 |
| JP | 57-167209 A | 10/1982 |
| JP | 62-113521 A | 5/1987 |
| JP | 63-67134 A | 3/1988 |
| JP | 63-78720 A | 4/1988 |
| JP | 2-182433 A | 7/1990 |
| JP | H0596548 A | 4/1993 |
| JP | 6-8250 A | 1/1994 |
| JP | 7-284189 A | 10/1995 |
| JP | 8-132498 A | 5/1996 |
| JP | 3058809 B2 | 7/2000 |
| JP | 2002-079559 A | 3/2002 |
| JP | 2002-264191 A | 9/2002 |
| JP | 2005-335234 A | 12/2005 |
| JP | 2006-255900 A | 9/2006 |
| TW | 390428 U | 5/2000 |
| TW | I221210 B | 9/2004 |
| TW | M245045 U | 10/2004 |
| TW | 2007-34160 A | 9/2007 |
| WO | WO 2006/089883 A1 | 8/2006 |
| WO | WO 2008/061683 * | 5/2008 |
| WO | WO 2008/061683 A1 | 5/2008 |
| WO | WO 2012133406 A1 | 10/2012 |

* cited by examiner

DEVICE AND METHOD FOR HEATING A MOULD OR TOOL

This application is the National Stage entry under 35 U.S.C. § 371 of PCT Application No. PCT/SE2012/050617, filed Jun. 8, 2012, which claims the benefit of U.S. Provisional Patent Application No. 61/501,976, filed Jun. 28, 2011, the contents of which are herein incorporated by reference in their entirety.

TECHNICAL FIELD

The present disclosure relates to devices and methods for use in forming resins or plastic materials.

BACKGROUND

It has been suggested to provide heating features in tools for forming plastic materials. The heating may be provided by inductive heating, i.e. by means of a coil that is provided with a high-frequency AC pulse. This may be used in injection moulding as well as in embossing/pressing of a plastic blank. The coil generates an oscillating magnetic field that, by inducing eddy currents, heats the mould or tool in the vicinity of the surface that will face the plastic material to be reshaped.

Cooling may also be provided by means of a fluid such as water, which flows in the vicinity of the tool or mould surface.

Different ways to achieve such heating have been disclosed. In US-2009/0068306-A a structure is shown having a coil carrier part which provides a magnetic field. The coil carrier functions as a soft ferrite and includes mutually electrically insulated magnetic granules, such as in PERMEDYN MF1. Closer to the mould or tool surface there is a top part for instance in the form of an austenitic steel which is not particularly ferromagnetic, and has a resistivity that is suitable, e.g. about $7*10^{-7}$ $\Omega$m, to develop heat from eddy currents induced by the coil. On the other side of the coil carrier as seen from the top part there is a back plate, for instance made of copper, that has a considerably lower resistivity than the top part. The back plate short-circuits the induced eddy currents on the backside of the coil. On top of the top part there is a stamper that includes the pattern to be replicated on the resin or blank in the mould or tool. This stack of materials has cooling ducts close to the top part.

In US-2009/0239023-A a further developed structure is shown where the above-described stack of materials is provided with one additional layer that separates the coil carrier part from the top part. This intermediate layer may consist of a ceramic material which is more or less magnetically and electrically passive, but has high mechanical resistance. The cooling ducts may be placed in this intermediate layer. The high mechanical resistance of the intermediate layer implies that the top part can be thin and thus have a lower specific heat. Thereby, the cycles can be shorter as the top part can quickly be cooled and heated. Moreover, as the cooling ducts can be moved out of contact with the top part, higher temperatures can be used without boiling the water in the ducts.

One problem associated with the known art is how to further improve the efficiency of a process involving such tools, and to do this in a cost-efficient manner.

SUMMARY

One object of the present disclosure is therefore to obtain a tool that has an improved efficiency.

This object is achieved by means of a tool as defined in claim 1. More specifically, a tool such as an injection moulding tool or an embossing/pressing tool comprising a heating device includes a stack of layers for heating an active tool surface. The stack comprises: a coil carrier layer including at least one wound coil for generating an oscillating magnetic field, an electrically conductive top layer, being adjacent to the active tool surface, and a backing layer, being positioned beneath the coil carrier layer as seen from the top layer, the backing layer being electrically connected to the top layer at the edges where windings of the coil turns, and having a lower resisitivity than the top layer. An electrically conductive intermediate layer is located between the coil carrier layer and the top layer, and the intermediate layer has a lower resistivity than the top layer. A corresponding production method is also considered.

In such a stack, the intermediate layer can convey energy to the top layer in a very efficient way, and can at the same time take up considerable mechanical loads if pressing/embossing takes place.

A thermal resistance layer may be placed between the intermediate layer and the top layer. Such a layer, e.g. made of glass, slows down the removal of heat from the top layer to some extent, thereby increasing the peak top layer temperature during a production cycle.

The intermediate layer may be provided with cooling ducts for conveying a cooling medium. This can shorten the production cycle. The top layer resistivity may be in the range between $1*10^{-7}$-$1*10^{-6}$ $\Omega$m, and the intermediate layer may have a resistivity in the range between $1$-$3*10^{-8}$ $\Omega$m.

The object is further achieved by means of a tool for embossing/pressing a blank at an active surface, where the tool has an electrically conductive top layer that is heated with currents induced by a coil, placed beneath the top layer as seen from the active surface. A backing layer is placed beneath the coil as seen from the active surface, the backing layer having a lower resistivity than the top layer and being connected to the top layer at least at the opposing edges where the windings of the coil turn. A conduction frame is provided, having a lower resistivity than the top layer and surrounding the active surface, such that the top layer, at least in the vicinity of some of its edges, rests on the conduction frame. A corresponding production method is also considered.

This provides good contact between the backing layer and the top layer to improve heating of the top layer, while at the same time allowing the top layer to float on top of the conduction frame.

The top layer may, at an edge where the windings of the coil turn, rest on the conduction frame at a distance from the edge of the top layer, such that this edge of the top layer is heated to a lesser extent than inner parts of the top layer when a current is lead from the backing layer and into the top layer. This may be advantageous for instance when producing a lightguide plate, where molten edges could otherwise introduce optical deficiencies that decrease the process yield.

A clamping device may be placed beneath the conduction frame as seen from the active surface. The clamping device may be moveable in relation to the layer on which it rests, such that the conduction frame may be clamped against the top layer during a phase when a current is led to the top layer from the backing layer. This improves electric conduction between the conduction frame and the top layer.

The clamping device may be devised as a frame with two compressed sealing rings, one surrounding the other and both surrounding the active surface of the tool, such that a closed spaced is formed between the sealing rings, and means, such as a conduit, to force a fluid into said closed space in order to increase the pressure therein, thereby raising the sealing rings to obtain the clamping motion.

The top layer may be divided into an upper top layer and a lower top layer, where the upper top layer comprises a metal with uniform resistivity which is higher than the resistivity of the backing layer, and the lower top layer has a pattern with varying resistivity, such that the heat generated at the active surface varies over the active surface. This allows an intentional variation of the heat development over the active surface.

The object is also achieved with a tool for embossing/pressing a blank with an active surface of the tool, where the tool has a stack of layers including a top layer at the active surface, and the top layer being heated during embossing/pressing. A cavity is defined between two layers in the stack beneath the top layer as seen from the active surface, and the cavity extends beneath a greater part of the active surface and is at least partly filled with a fluid. This equalises the pressure applied over the active surface of the tool, as the pressure will be uniform throughout the cavity. A corresponding production method is also considered.

It is possible, already in a state where the active surface does not touch a blank, to raise the pressure in the cavity such that it is higher than the atmospheric pressure, so that the top layer bulges to some extent. This serves to evacuate any air pockets from where the active surface of the tool interfaces with a blank.

DETAILED DESCRIPTION

The present disclosure relates to devices and methods for use in forming resins or plastic materials. The following description will mainly describe a system for embossing plastic blanks but, as the skilled person realizes, many technical solutions described herein may be equally applicable to injection moulding and other processes.

Figure 1:
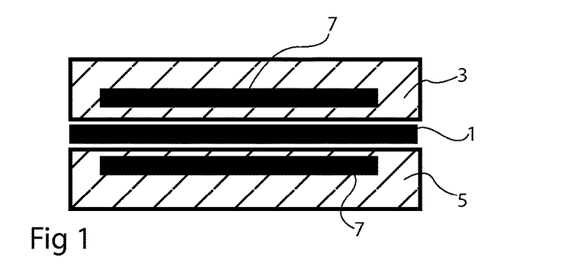
FIG. 1 illustrates, schematically, a tool for embossing/pressing a blank.

FIG. 1 illustrates, schematically and in cross section, a tool for embossing/pressing a blank 1. The tool has two tool halves 3, 5. Each or one of which may be provided with a heating device 7. In embossing, the blank 1, a solid piece of plastic, is reshaped to some extent by applying heat and pressure in a tool, i.e. pressing the halves against each other while heating the halves at the active surfaces thereof that face the blank 1. Typically, a surface pattern is applied. One example where this technology is used is when producing lightguides for backlit flatscreen LCD television screens. A transparent rectangular plastic sheet is then provided with a fine surface pattern on one flat surface thereof. When an edge of the sheet is illuminated, the surface pattern makes the injected light exit the lightguide, evenly over the surface. Such a pattern may be achieved by a stamper/top layer as described in the tool system disclosed below. Other products produced with embossing are also conceivable, e.g. Fresnel-lenses. In addition to, or as an alternative to providing surface patterns (embossing), it would also be possible to e.g. bend a blank (pressing). Comparatively short cycle times are provided with active heating and cooling.

Figure 2:
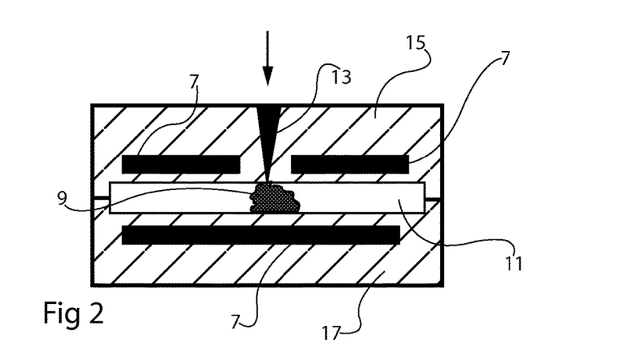
FIG. 2 schematically illustrates an injection moulding tool.

Injection moulding, schematically illustrated in FIG. 2, implies injecting molten resin 9 into a cavity 11 through a nozzle 13 (as illustrated by the arrow) to create a solid form. The heating devices 7 for the tool to be described below can be used to heat such a cavity and can be placed in one or more of the tool parts 15, 17 defining the cavity 11. This allows, as compared to a mould that is not heated, the production of thinner structures and finer patterns in the finished product. At the same time, shorter production cycles may be allowed, especially if the mould is also cooled actively, e.g. by means of fluid flowing in cooling ducts, during a part of the cycle. The heating technique disclosed could be useful also for blowforming processes.

Figure 3:
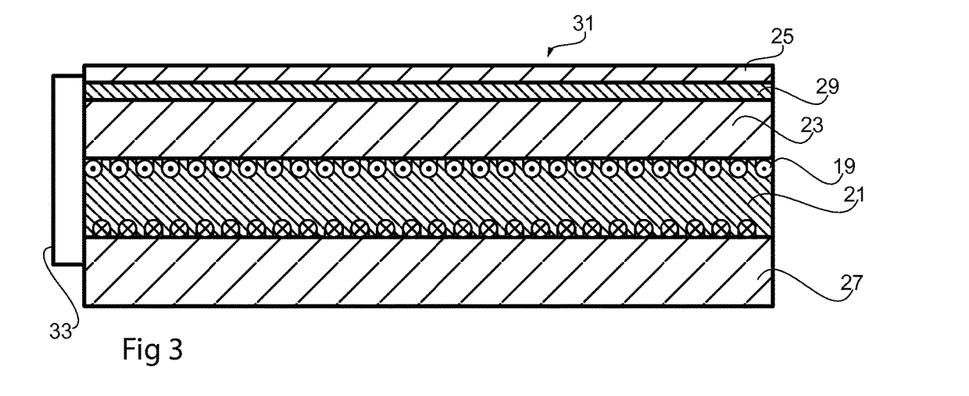
FIG. 3 illustrates schematically a stack of layers designed to provide efficient heating of a tool surface.

FIG. 3 illustrates, schematically and in cross section, a stack of layers designed to provide efficient heating of an active tool surface 31. By an active tool surface is here meant a surface that comes into contact with the plastic or resin to be reshaped. The stack of layers has an inductive coil 19, which can be used to provide mould or tool heating. The stack has a coil carrier layer 21, an electrically active intermediate layer 23, a top layer 25, a backing layer 27, and a thermal resistance layer 29.

The coil carrier layer 21 includes the wound coil 19 and is made of a material with high relative magnetic permeability, e.g. 300 at room temperature, and very high electric resisitivity, e.g. $2.5*10^{-3}$ Ωm. Thus, it is a material that is prone to conduct magnetic fields but that does not convey electric currents to any greater extent. This means that the coil carrier layer 21 will convey and shape the magnetic field, generated therein by the coil 19, to other layers, while not inducing any substantial eddy currents in the coil carrier layer 21 itself. The coil 19 is placed in open grooves and provides an even distribution of the field over the surface of the coil carrier. PERMEDYN MF1 (trademark) is considered one suitable material for the coil carrier layer and involves granules of ferromagnetic material baked together by an electrically insulating resin. In general, the coil carrier thickness may typically be in the range 10-30 mm.

The electrically active intermediate layer 23 comprises a metal with very low resistivity, (typically $1\text{-}310^{-8}$ Ωm or less), such as copper or aluminum. This layer is denoted as active as the coil induces currents therein. However, as the resistivity is so low, those currents do not develop heat to any greater extent. The thickness of the layer may typically be 10-30 mm, the relative magnetic permeability may be close to 1 (non-ferromagnetic) and the thermal conductivity may typically be 100-400 W/m/K.

The top layer 25 may comprise a metal with higher resistivity than the active intermediate layer 23. Austenitic steel, 1-2 mm thick, is one suitable example. As the resistivity is higher, this is the layer where the heat will be developed from eddy currents, induced by the coil 19 and via the active intermediate layer 23.

The top layer part may be non-ferromagnetic, and the resistivity may typically be in the range from $1*10^{-7}$-$1*10^{-6}$ Ωm. Thus, the top part is conductive, but considerably less conductive than the intermediate layer.

It may be suitable to divide the top layer into two sublayers. For instance, if a fine structure should be replicated by a stamper, this may suitably be made of Nickel which is treated with electroplating. As Nickel is ferromagnetic, the surface of the Nickel sublayer that faces the coils (rather than the active surface) will be heated, which is one reason why the layer may preferably be thin. Another reason is that it is time consuming to electroplate thick materials.

To have some thickness in the top part as a whole, a thin Nickel layer (e.g. 0.7 mm) may be placed on top of an austenitic non-ferromagnetic layer (e.g. 1.0 mm thick). This ensures even heat distribution. Yet another alternative would be a thick, 1-2 mm, Nickel layer, even if this may be expensive to produce.

A backing layer 27 (e.g. 2-15 mm thick) is provided on the other side of the coil carrier layer 21, as seen from the surface 31 that faces the resin or blank to be processed, and may be made of a similar material as the active intermediate layer 23. The backing layer 27 is electrically connected to the top layer 25 by means of a connection 33, which is very schematically indicated in FIG. 3 and will be described further later.

A thermal resistance layer 29 may be placed between the active intermediate layer 23, and the top layer 25. The thermal resistance layer 29 serves to obstruct the conveying of heat, from the top layer 25 to the active intermediate layer 23, to some extent, such that the top layer 25 may reach a higher peak temperature. Without this layer, a lower peak temperature would be reached in the top layer during a cycle, as more heat is then continuously removed from the top layer 25 and conveyed to the active intermediate layer 23.

The thickness of the thermal resistance layer may be e.g. in the range 1-5 mm depending on its heat conductive properties. This may be chosen in a trade-off between high top temperatures (thick) and short cycle times (thin). Electrically, the layer may be insulating and the thermal conductivity may typically be about 1 W/m/K. The relative magnetic permeability may be close to 1 (non-ferromagnetic). Glass is considered one suitable material.

The thermal resistance layer also makes the use of ferromagnetic top layers (e.g. Nickel) less problematic. Due to the skin effect in ferromagnetic materials, the side of the top layer that faces the coils will be primarily be heated. However, thanks to the thermal resistance layer, this thermal energy will be conveyed to the active surface rather than being conveyed to the active intermediate layer.

Below follows one example of layer materials and thicknesses thereof that can be used:

| Layer | Material | Thickness |
| --- | --- | --- |
| Top layer | Austenitic steel/Ni-stamper | 1.0/0.7 mm |
| Thermal resistance layer | Glass | 3 mm |
| Active intermediate layer | Cu-alloy | 15 mm |
| Coil carrier layer | Permedyn MF1 | 30 mm |
| Backing layer | Cu | 5 mm |

In a simulation, where AC power with the frequency of 25 kHz and with the power volume density of $1.5*10^8$ W/m³ is applied, the temperature increase in the top layer after 10 seconds is 200° C. At the same time the temperature in the backing layer rises only ~3° C., in the coil carrier ~6° C., and in the intermediate layer ~15° C.

Figures 4, 5:
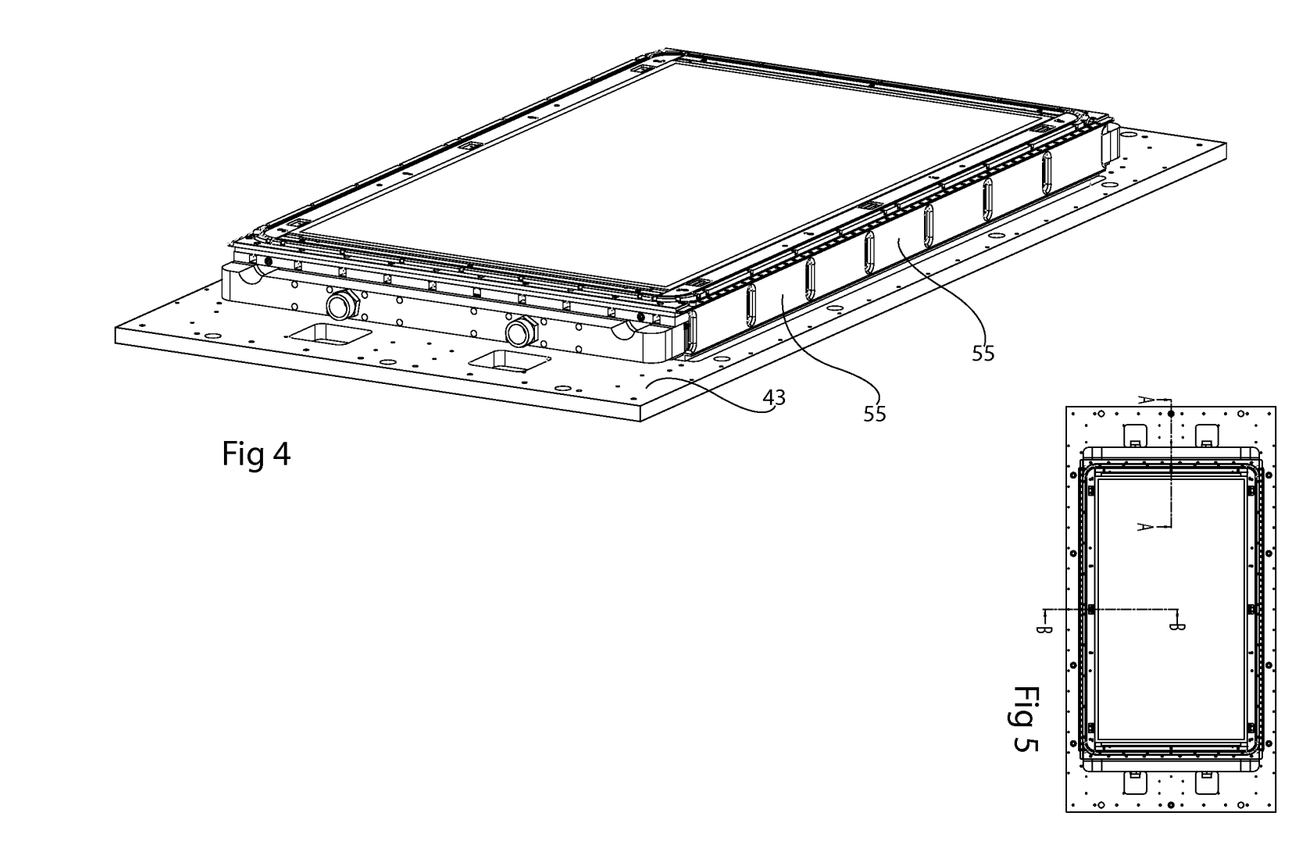
FIG. 4 shows an perspective view of an embossing/pressing tool halve.
FIG. 5 shows a top view of the tool halve in FIG. 4 indicating the locations of two cross sections, A-A and B-B.

FIG. 4 shows an perspective view of an embossing or pressing tool halve. This tool may be used to emboss plastic lightguides for a 42 inch LCD TV, i.e. a substrate/blank with approximately the dimensions 930×520 mm. The opposing halve (not shown) may be more or less a mirror image of the shown halve and is not described further. The tool is built in correspondence with the concept outlined in FIG. 3, and is built upon a foundation plate 43 which carries the tool halve and includes all mechanical connections needed to provide a pressing function.

FIG. 5 shows a small top view of the tool halve in FIG. 4 and indicates the locations of two cross sections A-A and B-B that will be discussed in detail after a brief explanation of the overall working principle of the tool heating.

Figure 6:
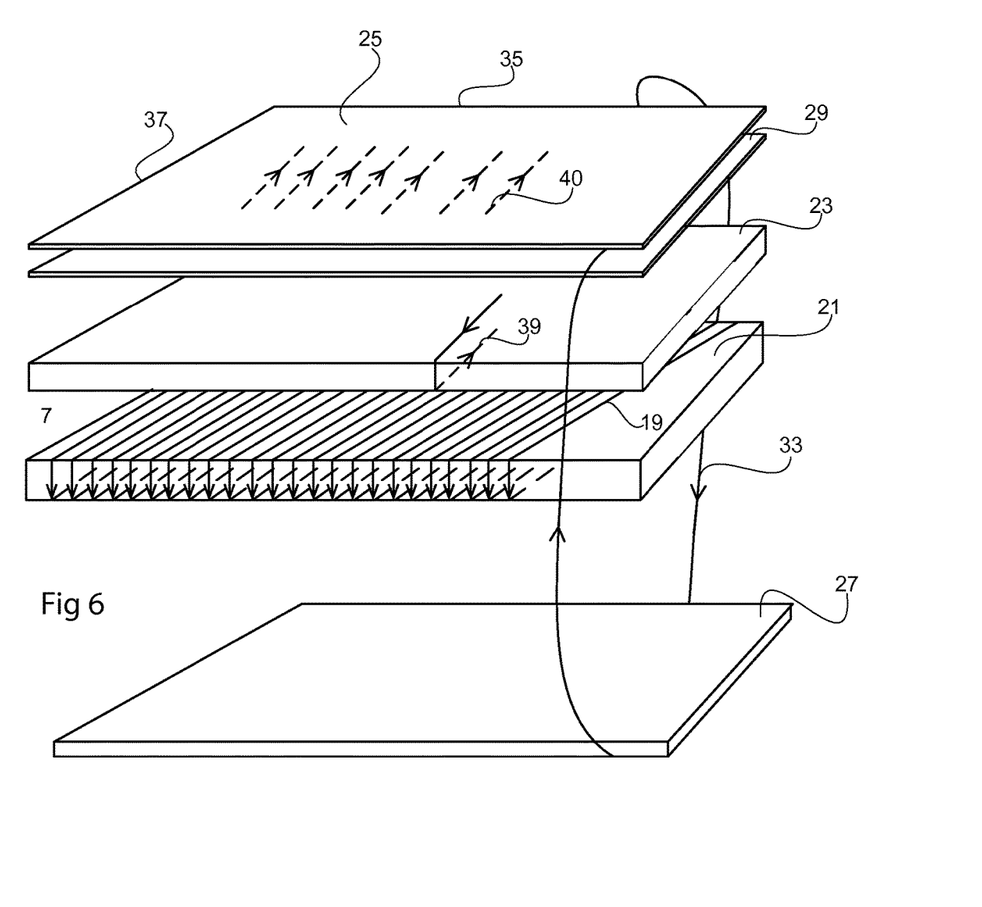
FIG. 6 illustrates schematically the induction of currents in the layers of FIG. 3.

FIG. 6 illustrates the induction of currents in the layers of FIG. 3, the stack of FIG. 3 being in an exploded perspective view. In the illustrated case, the top layer 25 is rectangular with a 930 mm long side 35 and a 520 mm short side 37. The other layers have corresponding formats. The coil carrier layer 21 is wound with a coil 19 having windings in the direction parallel with the rectangle's short side 37, i.e. the winding turns are located at the long side. When a high-frequency AC pulse is applied to the coil 19, a current 39, corresponding to the current in the coil 19 will be induced in the lower surface of the active intermediate layer 23. This current will form a closed current loop at the surface of the active intermediate layer 23 running antiparallel with the neighboring coil current at the lower surface of the active intermediate layer 23 and parallel with the same at the upper (as seen from the top layer 25) surface. Those currents are interconnected at the long edges of the active intermediate layer, and the currents reside primarily in the close vicinity of the active intermediate layer surface due to the skin effect. The AC current in the top surface of the active intermediate layer 23 will in turn induce a current 40 in the top layer 25. As the top layer 25 has a higher resistivity, this layer will develop a considerable amount of heat. The top layer is electrically connected, with connections 33, continuously or at some intervals, at the long sides thereof, to the backing layer 27 to allow this current to flow over the entire top layer surface.

The coil at the backside of the coil carrier will induce a current in the backing layer 27 similar to in the active intermediate layer. This current will have the same direction as, and will be superimposed with, the current 40. Due to its low resistivity, very little heat will develop in the backing layer 27.

The active intermediate layer 23 may be provided with cooling ducts (not shown) to allow cooling of the mould or tool. The ducts may convey a cooling medium such as water or oil. The flow can be continuous, or can be pulsed in order to provide cooling during only one phase of a production cycle.

Figure 7:
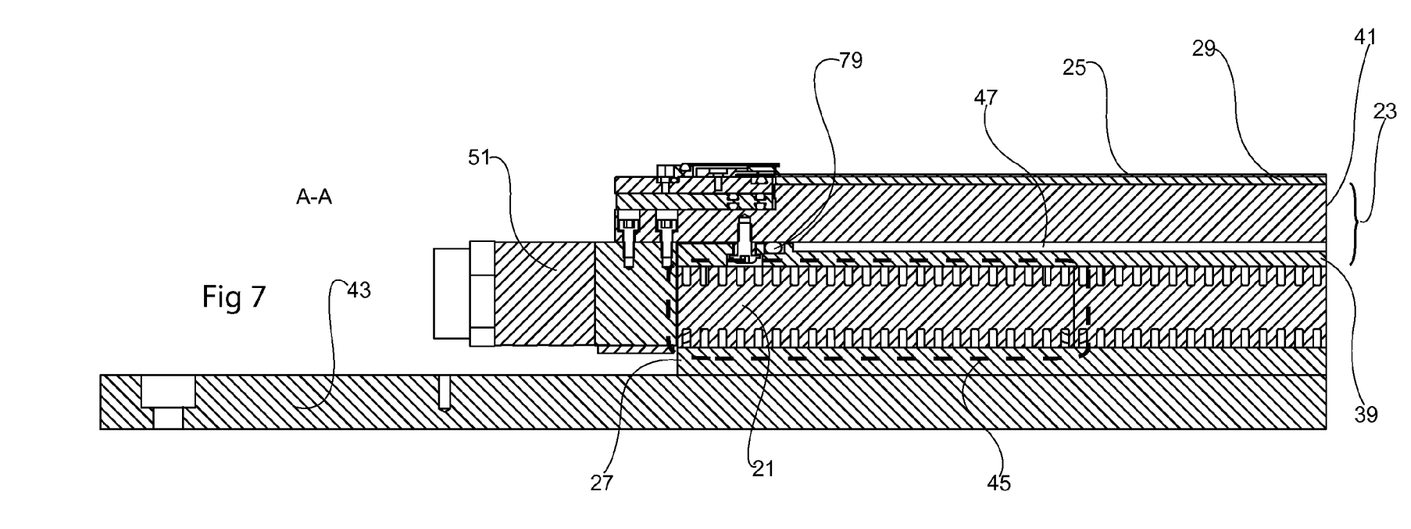
FIG. 7 shows the cross section A-A from the tool halve of FIG. 4, at a short edge if the tool surface.

With reference to FIG. 7, the cross section A-A in FIG. 5 is now discussed in greater detail with occasional references to the perspective view of FIG. 4.

A stack of layers corresponding to the schematic outline of FIG. 3 is built up on the foundation plate 43. To start with, the backing layer plate 27 is located on the foundation plate 43, and is followed by the coil carrier 21, which in the illustrated case has seven coil sections 45, each carrying a coil (not shown). These coils may each be fed by an individual inverter, but in synchronism with each other. This is an advantage as compared to feeding the coil sections with a common inverter, as insulation requirements may be less demanding.

In the illustrated case, the active intermediate layer 23, which is placed on the coil carrier 21, comprises two sublayers 39, 41, and includes cooling channels (not visible in FIG. 7) that will be discussed later. The first sublayer 39 is hollowed by machining, such that the first and second sublayers 39, 41 together define a flat cavity 47 that may extend beneath a greater part of the active tool surface. In operation, this cavity may be filled with a fluid and acts as a fluid pressure equalizer as will be discussed later.

The second active intermediate sublayer 41 contains the cooling ducts, which are fed by a fluid splitter block 51, in steps symmetrically dividing a main flow into a number of equal sub-flows, one for each duct. On top of the second sublayer 41, the thermal resistance layer 29 is located and is followed by the top layer/stamper 25.

Below follows an example of materials and thicknesses that can be used in the tool halve shown in FIG. 4.

| Item | Thickness [mm] | Example material |
| --- | --- | --- |
| Backing layer (27) | 10 | Copper |
| Connection bars (55) | 10 | Copper |
| Coil carrier (21) | 30 | Permedyn MF1 |
| Intermediate base (39) | 8, 5 | Aluminium |
| Intermediate top (41) | 21, 15 | Aluminium |
| Thermal resistance (29) | 3 | Glass |
| Top layer (25) | 1 | Austenitic steel |

Each tool halve may have seven coils, each with 22 winding turns that are synchronously fed, each coil with a 25 kW/25 kHz/10 second pulse during embossing.

Figure 8:
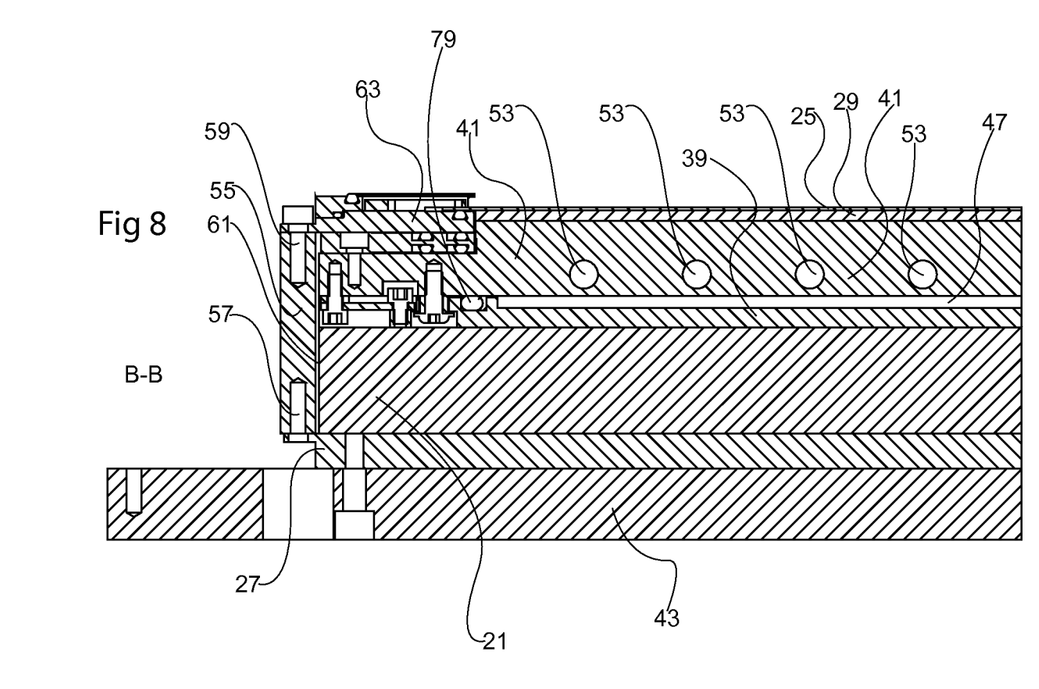
FIG. 8 shows the cross section B-B from the tool halve of FIG. 4, at a long edge if the tool surface.

FIG. 8 shows the cross section B-B in FIG. 5 from the tool halve of FIG. 5, at a short edge thereof. The cross section shows the foundation plate 43, the backing plate 27, the coil carrier 21, and the active intermediate layer's two sublayers 39, 41, with the intervening cavity 47. The thermal resistance layer 29 and the top layer/stamper 25 are also shown.

The second active intermediate sublayer 41 contains the cooling ducts 53, which extend along the length of the tool's active area, i.e. where pressing and heating takes place. The cooling ducts 53 may, as in the illustrated case, be drilled as long holes through the entire length of the second sublayer 41. The holes may be plugged at the ends and may be provided with connecting holes that extend through the flat surface of the sublayer 41 in the vicinity to the edge where the hole is plugged. The connecting holes may be connected to the fluid splitter block.

One possible alternative to providing cooling ducts in the form of drilled holes 53 is to provide the second sublayer 41 as two sublayers, and to form the cooling ducts by machining grooves in the flat surface of one or both of these sublayers.

FIG. 8 further shows a connection bar 55 that connects the backing layer 27 with the top layer 25. This provides the connection (schematically indicated cf. 33 in FIG. 3) that allows the heat generating current to flow in the top layer 25. The connection bar is attached with screws 57, 59 to the backing layer 27 and a conduction frame 63, on which the top layer 25 rests, respectively. Typically, one such connection bar may be provided per coil section at each long side of the tool, as shown in FIG. 4. A gap 61 may be provided between the connection bar 55 and the active intermediate sublayers 39, 41.

The stack of layers illustrated above provides excellent heating of the tool. The illustrated tool however involves a number of additional technical solutions that will now be discussed in greater detail.

Equalizing Pressure

Particularly when pressing/embossing a blank to provide a lightguide plate an equal pressing force and absence of shear forces provides good optical properties. The fluid filled cavity 47 shown in FIGS. 7 and 8 equalizes the pressure over the surface and the tool and does not convey shear forces at all. The result of this feature, that can be used also without active heating or with alternative means of active heating, is improved quality of the finished product and/or an improved yield as compared to a tool where the fluid filled cavity 47 is not used.

The cavity 47 may extend beneath the greater part of the active surface. The fluid layer formed therein need not be thick, 4-5 mm may be one useful example. The fluid used could be water, but oil is another alternative. The fluid is confined within the cavity by a seal 79 that is compressed between the active intermediate sublayers 39, 41 and runs in a groove in either sublayer, the groove surrounding the cavity 47. The pressing of the tool raises the fluid pressure considerably. This pressure will be uniform throughout the cavity, ensuring an even pressure force over the active surface.

It is possible to apply a positive pressure in the cavity, e.g. 0.5-1 bar overpressure by pumping a limited amount of air into the cavity when it is filled with a liquid and closed. This will cause the second sublayer 41, as well as the layers on top of the latter, to bulge slightly. This provides the effect that, when pressure is applied between the tool halves and a blank, trapped pockets of air between the tool halve and the blank can be avoided. The mid portion of the active tool surface will press against the blank first, and will evacuate all air towards the edges as the pressing force increases. At final pressure (e.g. 2 MPa) when the embossing takes place, however, this bulging effect is negligible and does not affect the final result. Thanks to this positive pressure however, the risk of having pockets of air trapped between the tool halve and the blank can be more or less eliminated.

It is possible to provide a pressure sensor in contact with the fluid to provide a feedback signal indicating the applied pressure.

Improving Contact with Top Layer

Figure 11:
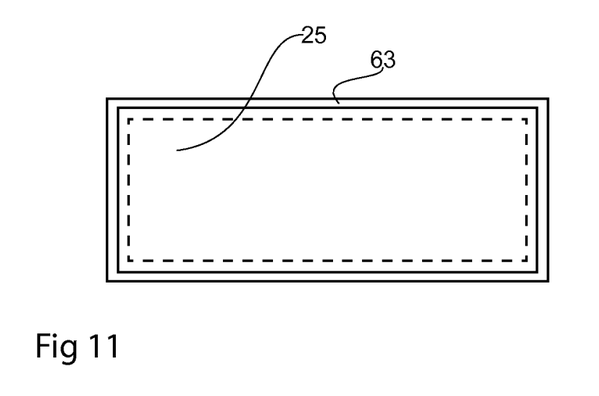
FIG. 11 illustrates how a top layer can rest on a conduction frame in order to establish good electric contact between the top layer and a backing layer.

Even though the top layer 25 may be very thin in many cases, and may expand and contract to some extent during heating and cooling, respectively, a reliable connection to the backing layer 27 should be provided at the edges where currents are to enter. This may be accomplished by a conduction frame 63, e.g. made of copper, that encloses the entire active surface of the tool halve. The top layer 25 rests in a floating manner on the conduction frame 63 at the edges of the top layer. This is also illustrated in FIG. 11.

Figure 9A:
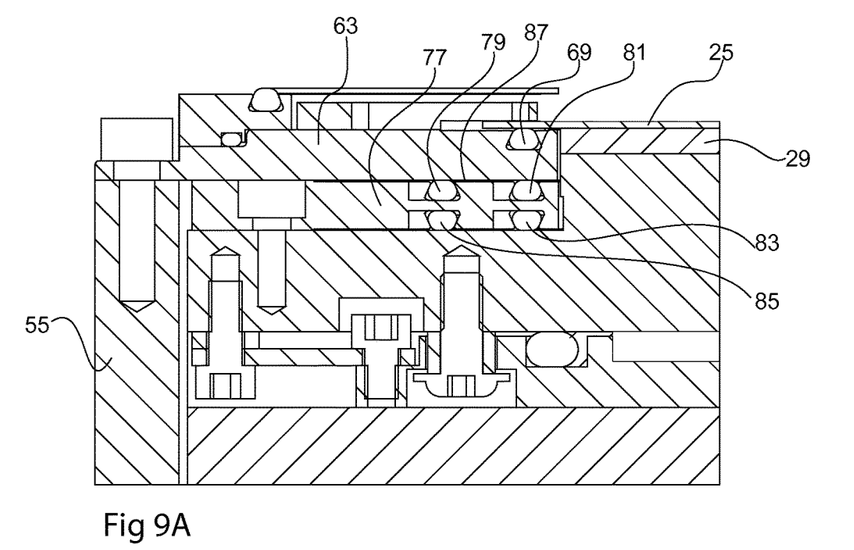
FIGS. 9A and 9B illustrate details in the cross section of FIG. 8.

Thus, as indicated in FIG. 9A, the top layer 25 is allowed to float on the thermal resistance layer 29 and the conduction frame 63. This is advantageous as the top layer is allowed to expand and contract without being influenced by screws or the like that could otherwise cause the top layer to be deformed out of its plane. The conduction frame 63, to which the connection bar 55 is connected, still provides a good contact between the top layer 25 and the backing layer 27.

The galvanic contact between the top layer 25 and the conduction frame 63 may be further improved. The top layer may typically carry as much as 25000 Ampere as a maximum current from long edge to long edge, and even if this current is distributed over the entire length of the active surface, the current density is significant.

In order to provide excellent contact to the top layer 25 while allowing the same to float, a clamping device 77 is provided beneath the conduction frame 63.

Thus, when the blank is pressed between the two tool halves, it is possible to activate the clamping device 77 which then pushes the conduction frame 63 against the top layer 25, thereby providing excellent galvanic contact therebetween.

Even though currents with considerable amplitudes are primarily conveyed between the conduction frame and the top layer at the long edges, where the coils turn in this example, it may be preferred to provide the clamping effect between the top layer and the current around the entire perimeter of the top layer, i.e. also at the short edges. This may prevent undesired field anomalies e.g. at the top layer corners.

The clamping device may as indicated in FIG. 9A comprise of a frame 77 of an insulating material such as plastic on which the conduction frame 63 rests. This plastic frame has two grooves in the lower surface and two grooves in the upper surface, in which inner 81, 83 and outer 79, 85 compressed sealing rings run. As indicated in FIG. 9A, the thickness of the plastic frame 77 in its inner region, where the grooves are placed, is somewhat reduced such that a small space 87 is formed between each pair of inner and outer sealing rings. Those spaces may be interconnected by holes running through the plastic frame 77 between inner and outer sealing rings. By raising the pressure in this confined space, for instance by means of compressed air, which is supplied through a conduit, the sealing rings will raise the conductor frame 63 slightly, thereby providing the clamping movement.

Blank Edge Thermal Profile

When producing a lightguide as mentioned above, the edges of the may require special attention. If the resin melts too much at the very edge, light may leak at the edge in an unintended way. Also the thickness of the blank at the edges may decrease. At the same time it is desired to apply pressure over the whole blank surface.

One way of dealing with this is to make sure that the blank is heated less at the edges. This provides a "cold frame" surrounding the inner part of the blank where the surface is melted by the applied heating. This may result in a lightguide with more uniform thickness where there are less optical defects at the edges that leak light.

This feature may be provided in different ways at the long and short edges of the tool halve.

Figure 9B:
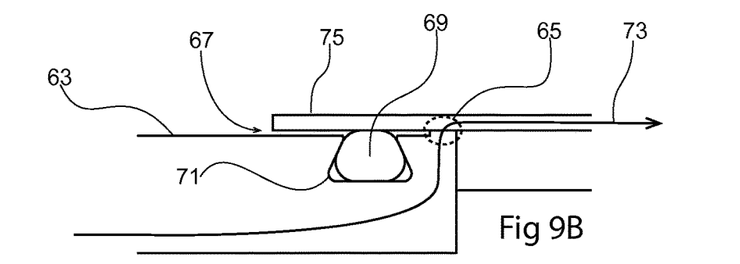

FIGS. 9A and 9B as mentioned illustrate details in the cross section of FIG. 8. At the long edges of the tool halve, the outer part of the conductor frame 63 is connected with screws to the connection bars 55. The inner part of the conduction frame 63 makes contact with the top layer/stamper 25. The top layer 25 overlaps and floats on the conduction frame 63 on a contact region 65 at the innermost part thereof, as shown in FIG. 9B. Outside, the contact region 65, which may be e.g. 1 mm long, there is provided a gap 67 of e.g. 0.2 mm between the top layer 25 and the conduction frame 63 as the contact region 65 projects slightly from the conduction frame body. The top layer 25 also rests on a sealing ring 69 placed in a groove 71 in the conduction frame 63. When the tool is opened after embossing, the floating top layer 25 can then be kept in place by keeping a low pressure behind the top layer. As the conduction frame 63 makes contact with the top layer 25 at some distance from the latter's edge, the current 73 led by the conduction frame 63 will enter the top layer at this distance from the top layer edge, resulting in a comparatively less heated portion 75 of the top layer at the blank edge.

Figure 10:
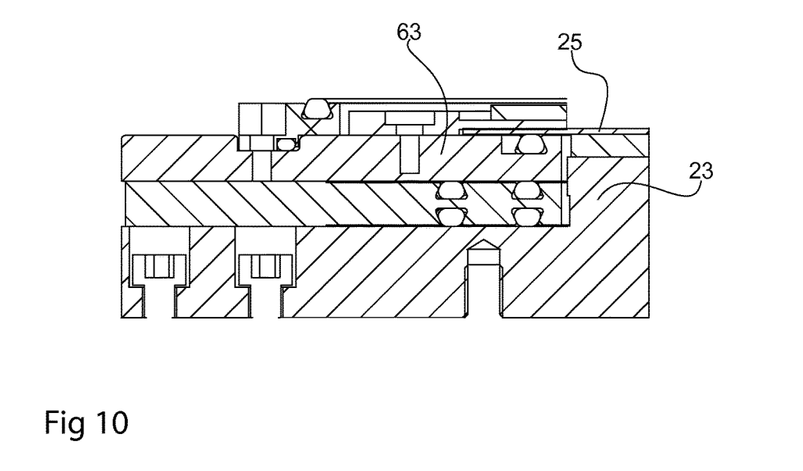
FIG. 10 shows a detail of the cross section in FIG. 7.

FIG. 10 shows a detail of the cross section in FIG. 7. In this section, at the short edge of the tool halve, the conduction frame 63 will act as a shunt that interconnects the long edges of the tool halve. This part of the conduction frame 63 will therefore lead a considerable current directed perpendicularly to the plane of the cross section in FIG. 10. As the copper conduction frame 63 has a very low resistivity as compared with the top layer 25, this current will not lead to the conduction frame being heated to any greater extent. However, this current, which alternates with the same frequency as all other currents in the tool, will in turn create a magnetic field that counteracts the magnetic field induced in the top layer 25 by the active intermediate layer 23 as the currents of the top part of the active intermediate layer and the conduction frame have opposite directions. This forces the induced magnetic field in the top layer away from the short edge of the top layer 25, such that also this edge will be heated less than the inner part of the tool halve.

Thereby, a relatively cooler frame of the blank can be achieved around the edges of the same.

Figure 12A:
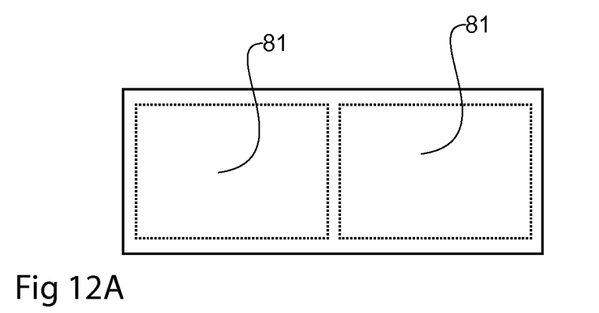
FIGS. 12A and 12B illustrate how a patterned lower top layer can be used to vary the heat development over the top layer's active surface.
Figure 12B:
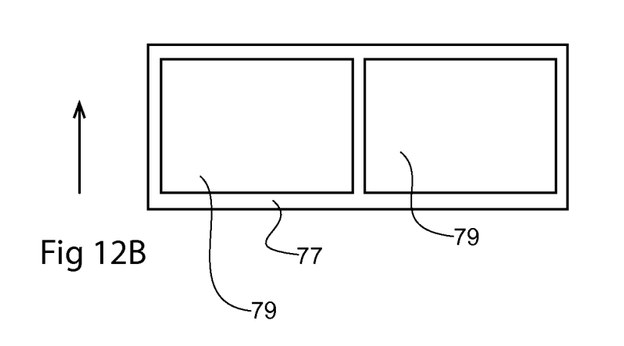

FIGS. 12A and 12B illustrate an additional way of intentionally varying the heat development over the active surface of the tool halve. In this case a top layer with two sub-layers are used, that together rest on the conduction frame (cf. FIG. 11). The upper top layer may in FIG. 12A be devised as previously mentioned, i.e. a uniform ferromagnetic or non-ferromagnetic layer, such as e.g. Nickel, an austenitic steel or a nickel-steel combination.

The lower top layer in FIG. 12B may be patterned. Typically, the pattern may comprise a copper sheet 77 which has cutouts 79 on the areas that are to be heated. If the direction of the instantaneous current is as illustrated with the arrow in FIG. 12B, the upper top layer will not be heated to any greater extent in areas where the lower top layer consists of copper. In those areas the current will be lead through the lower layer which has a lower resistivity. The cutout areas may be covered with an insulating material, such as glass, with equal thickness as the copper sheet. This forces the currents to the upper top layer in this region, thereby heating the upper top layer and the active surface. As an alternative to an insulator, a material with similar or equal resistivity as the upper top layer may be used, such as an austenitic steel. This causes both the upper and lower top layers to be heated in these regions. In any case, the result is hotter sub-areas 81 in the active surface. This may be used, for instance, to simultaneously emboss two blanks, each of which have a comparatively colder surrounding frame, as previously discussed. The skilled person realizes that the heat development over the active surface can be varied in other ways to obtain different results. One tool may, by changing the lower top layer, be used in many different ways.

The invention is not restricted to the above described embodiments and may be varied and altered in different ways within the scope of the appended claims. For instance, the coils may be wound from short edge to short edge, instead of as illustrated where the coil winding turns are located at the long edges of the active surface. Other materials having similar properties as the ones described above can be used. For instance, instead of austenitic steels in the top layer, e.g. Ferritic or Martensitic steels could be considered.

Copper alloys can in many cases be replaced by Aluminum alloys, etc.

The invention claimed is:

1. A tool such as an injection moulding tool or an embossing/pressing tool comprising a heating device including a stack of layers for heating an active tool surface, the stack comprising:
a coil carrier layer including at least one wound coil for generating an oscillating magnetic field,
an electrically conductive top layer, being adjacent to the active tool surface, and
a backing layer, being positioned beneath the coil carrier layer as seen from the top layer, the backing layer being electrically connected to the top layer at the edges where windings of the coil turn, and having a lower resistivity than the top layer, wherein an electrically conductive intermediate layer, located between the coil carrier layer and the top layer, wherein the intermediate layer has a lower resistivity than the top layer.

2. A tool according to claim 1, wherein a thermal resistance layer is placed between the intermediate layer and the top layer.

3. A tool according to claim 1, wherein the intermediate layer has cooling ducts for conveying a cooling medium.

4. A tool according to claim 1, wherein the top layer has a resistivity in the range between $1*10^{-7}$-$1*10^{-6}$ $\Omega$m, and the intermediate layer has a resistivity in the range between $1$-$3*10^{-8}$ $\Omega$m.

5. A production method using a tool such as an injection moulding tool or an embossing/pressing tool comprising a heating device including a stack of layers for heating an active tool surface, the stack comprising:
a coil carrier layer including at least one wound coil for generating an oscillating magnetic field,
an electrically conductive top layer, being adjacent to the active tool surface, and
a backing layer, being positioned beneath the coil carrier layer as seen from the top layer, the backing layer being electrically connected to the top layer at the edges where windings of the coil turns, and having a lower resistivity than the top layer, wherein energy is conveyed from the coil to the top layer using an electrically conductive intermediate layer, located between the coil carrier layer and the top layer, wherein the intermediate layer has a lower resistivity than the top layer.

6. A tool for embossing/pressing a blank at an active surface, the tool comprising:
an electrically conductive top layer that is heated with currents induced by a coil, placed beneath the top layer as seen from the active surface,
a backing layer being placed beneath the coil as seen from the active surface, the backing layer having a lower resistivity than the top layer and being connected to the top layer at least at the opposing edges where the windings of the coil turn, and
a conduction frame, having a lower resistivity than the top layer and surrounding the active surface, such that the top layer, at least in the vicinity of some of its edges, rests on the conduction frame in a floating manner.

7. A tool according to claim 6, wherein, at an edge where said windings turn, the top layer rests on the conduction frame at a distance from the edge of the top layer, such that this edge of the top layer is heated to a lesser extent than inner parts of the top layer when a current is lead from the backing layer and into the top layer.

8. A tool according to claim 6, wherein a clamping frame is placed beneath the conduction frame as seen from the active surface, the clamping frame resting on a layer placed beneath the conduction frame as seen from the active surface, the clamping frame being moveable in relation to the layer on which it rests, such that the conduction frame may be clamped against the top layer during a phase when a current is led to the top layer from the backing layer.

9. A tool according to claim 8, wherein at least one side of the clamping frame has two compressed sealing rings, one surrounding the other and both surrounding the active surface of the tool, such that a closed space is formed between the sealing rings, and means to force a fluid into said closed space in order to increase the pressure therein, thereby raising the sealing rings to obtain the clamping motion.

10. A tool according to claim 6, wherein the top layer is divided into an upper top layer and a lower top layer, the upper top layer comprising a metal with uniform resistivity which is higher than the resistivity of the backing layer, the lower top layer having a pattern with varying resistivity, such that the heat generated at the active surface varies over the active surface.

11. A production method using a tool for embossing/pressing a blank at an active surface, the tool having an electrically conductive top layer that is heated with currents induced by a coil, placed beneath the top layer as seen from the active surface, a backing layer being placed beneath the coil as seen from the active surface, the backing layer having a lower resistivity than the top layer and being connected to the top layer at least at the opposing edges where the windings of the coil turn, wherein a current is conveyed from the backing layer to the top layer using a conduction frame, having a lower resistivity than the top layer and surrounding the active surface, such that the top layer, at least in the vicinity of some of its edges, rests on the conduction frame in a floating manner.

12. A tool for embossing/pressing a blank with an active surface of the tool, the tool comprising a stack of layers including a top layer at the active surface and a backing layer placed beneath the top layer as seen from the active surface, the top layer being heated during embossing/pressing, wherein the backing layer has a lower electrical resistivity than the top layer and the tool includes a cavity which is defined between the top layer and the backing layer, the cavity extending beneath at least a part of the active surface and being at least partly filled with a fluid.

13. A tool according to claim 12, wherein, already in a state where the active surface does not touch a blank, the pressure in the cavity is higher than the atmospheric pressure, such that the top layer bulges to some extent.

14. A production method using a tool for embossing/pressing a blank with an active surface of the tool, the tool comprising a stack of layers including a top layer at the active surface and a backing layer placed beneath the top layer as seen from the active surface, the top layer being heated during embossing/pressing, wherein the backing layer has a lower electrical resistivity than the top layer and the production method comprises pressing the blank via a cavity which is defined between the top layer and the backing layer, the cavity extending beneath at least a part of the active surface and being at least partly filled with a fluid.

* * * * *